(12) United States Patent
Kimura et al.

(10) Patent No.: US 7,419,539 B2
(45) Date of Patent: Sep. 2, 2008

(54) METALLIC PLATE OR RESIN STRUCTURE HAVING PHOTOCATALYST-SUPPORTING FILM LAMINATED THERETO

(75) Inventors: Nobuo Kimura, Kanagawa (JP); Kazuo Ono, Ichihara (JP); Shigemichi Fukayama, Hamamatsu (JP); Masayuki Kataoka, Ichihara (JP); Kazuji Okabe, Iwaki (JP); Yoshiharu Komoda, Kitaibaraki (JP)

(73) Assignee: Nippon Soda Co., Ltd., Tokyo (JP)

( * ) Notice: Subject to any disclaimer, the term of this patent is extended or adjusted under 35 U.S.C. 154(b) by 0 days.

(21) Appl. No.: 11/715,943

(22) Filed: Mar. 9, 2007

(65) Prior Publication Data

US 2007/0161760 A1    Jul. 12, 2007

Related U.S. Application Data

(62) Division of application No. 09/530,196, filed as application No. PCT/JP98/04981 on Nov. 5, 1998, now Pat. No. 7,208,443.

(30) Foreign Application Priority Data

Nov. 7, 1997  (JP) ............................. 1997/322247
Nov. 7, 1997  (JP) ............................. 1997/322248

(51) Int. Cl.
    *B01J 21/00*  (2006.01)
(52) U.S. Cl. ....................................... 106/475; 502/232
(58) Field of Classification Search ................. 106/475; 502/350, 159, 232
    See application file for complete search history.

(56) References Cited

U.S. PATENT DOCUMENTS

| 6,228,480 | B1 | 5/2001 | Kimura et al. |
| 6,306,796 | B1 | 10/2001 | Suzue et al. |
| 6,407,033 | B1 | 6/2002 | Kimura et al. |
| 2002/0016250 | A1 | 2/2002 | Hayakwa et al. |

FOREIGN PATENT DOCUMENTS

| JP | 9-1724 A | 1/1997 |
| JP | 9-57911 A | 3/1997 |
| JP | 9-262481 A | 10/1997 |
| WO | WO 9700134 A1 | 1/1997 |
| WO | WO 9843733 A1 | 10/1998 |

*Primary Examiner*—Edward M Johnson
(74) *Attorney, Agent, or Firm*—Venable LLP; Marina V. Schneller

(57) ABSTRACT

A metallic or resinous material having excellent deodorant, antifouling, antibacterial, antifungal, and other effects which can be industrially efficiently provided by applying to a polymer resin film an adhesive coating fluid containing a silane coupling as a hardener, drying the coating to form an adhesive layer, applying a coating fluid for photocatalyst-layer formation, subsequently drying the coating to produce a photocatalyst-supporting film consisting of the polymer film and a photocatalyst layer deposited thereon through the adhesive layer, and laminating this photocatalyst-supporting film to the surface of a metallic plate or resin structure by heat pressing. The laminate may be processed into a complicated shape.

2 Claims, 1 Drawing Sheet

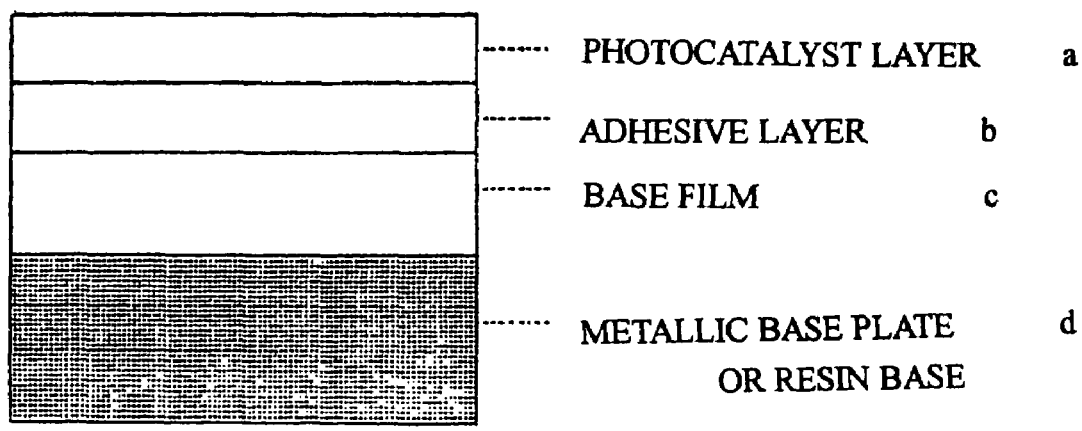

ic plate or the resin structure can be corroded to cause aerugo at the time of coating and drying process depending upon pH in the coating solution to be coated onto a adhesive layer and photocatalyst layer, and coating to form a uniform layer onto a metallic plate or a resin structure either by dipping or spray-

METALLIC PLATE OR RESIN STRUCTURE HAVING PHOTOCATALYST-SUPPORTING FILM LAMINATED THERETO

CROSS-REFERENCE TO RELATED APPLICATION

This application is a Divisional of application Ser. No. 09/530,196, filed Aug. 22, 2000, which is a U.S. National Stage of International Application No. PCT/JP98//04981, filed Nov. 5, 1998, which claims priority to Japanese Application No. 322247/1997, filed Nov. 7, 1997, and Japanese Application No. 322248/1997, filed Nov. 7, 1997. the entire specification of which is incorporated herewith by reference.

FIELD OF THE INVENTION

The present invention is related to a metallic plate, a metallic plate coated with resin, a painted metallic plate, an enameled metallic plate or a resin structure, which are obtainable by laminating thereto a photocatalyst-supporting film having deodorant, antifouling, antibacterial, antifungal and other effects by means of heat-pressing, a method for preparing such metallic plates and resin structures and products for which such metallic plates and resin structure are applicable.

BACKGROUND ART

Titanium dioxide, which is n-type semiconductor, has been known as a photocatalyst that activates various chemical reactions with ultraviolet radiation energy, such as chemical reactions resulted in during a process of pasteurization and decomposition of organic substance. On the other hand, various methods to carry a photocatalyst layer onto a glass plate, plastics, tiles, etc. have been proposed (See JP Laid-opened No. Sho 62-66861 and No. Hei 5-309267, EP 633064 and U.S. Pat. No. 4,888,101) have been proposed. However, these methods are respectively having problems, such as insufficient photocatalytic activity and short durability.

In WO 97-134 gazette, an example which enables to provide a resin structure having high photocatalytic activity and excellent durability prepared by means of carrying a photocatalyst layer composed of photocatalyst particles complex containing metal oxide gel thereon via an adhesive layer composed of acrylsilicon resin added with polysiloxane by either dipping or spraying method is disclosed. For carrying a photocatalyst onto a metallic plate, a coated metallic plate, a resin-coated metallic plate, an enameled metallic plate, a resin substrate or a coated resin substrate for aiming at providing antifouling, antibacterial and deodorant activity, a method to directly provide a photocatalyst structure which is supporting a photocatalyst layer via an adhesive layer onto a metallic plate or the like can be employed. However, such method has problems in production cost, since it requires long drying process after coating, and particularly in case of a metallic plate or a resin substrate longer than one meter, a big size drier and long drying process more than 30 minutes are required, which is the cause to make production speed slow and high cost. In addition, there are further problems in the process in large scale production point of view such that the type and the size of applicable metallic plates and resin structures might be limited because of the reasons that a metallic plate or a resin structure can be corroded to cause aerugo at the time of coating and drying process depending upon pH in the coating solution to be coated onto a adhesive layer and photocatalyst layer, and coating to form a uniform layer onto a metallic plate or a resin structure either by dipping or spraying can be difficult in case of forming a thick layer more than 1 mm and then to cause the thickness of a layer irregular.

On the other hand, the difficulty mentioned above can be resolved if it is possible to laminate a film, which is uniformly coated with a transparent photocatalyst layer in advance onto a metallic plate or a resin substrate, even though taking the time required for laminating the film onto a flat layer into consideration, because efficiency to produce films for lamination use is higher than the coating the solution onto such structures. In WO 97-134 gazette, a laminating film prepared by coating a sticking agent onto a reverse side of a photocatalyst-supporting film is disclosed. However, for industrial scale production, laminating a film by means of heating and pressing requires less production process than laminating by means of adhesion. Further, for molding laminated-products, laminated films by means of heating and pressing is more advantageous from a view point that those films can be molded and processed without considering shrinkage of an adhesive layer by heating. However, due to laminating by heating and pressing, the activity of a photocatalyst may deteriorate. Therefore, no resin structure whereto a photocatalyst-supporting film is laminated by heating without getting reduction of photocatalytic activity onto a metallic plate or a resin structure, particularly onto a polycarbonate resin and poly(vinyl chloride) resin reinforced with a cloth being widely-used, has known.

Moreover, the coating solution disclosed in the gazette has difficulty in sufficient drying and hardening of the solution at forming films at high speed, thereby causing a problem of adhesion of the coated-solution to the reverse side of the film. Particularly, films which can be laminated by heating and pressing normally have low heat-resisting property and low distortion temperature such like 100° C. or lower, it is difficult to use the coating solution and the coating process disclosed in WO 97-134 gazette for high speed lamination of films suitably laminated by heating.

DISCLOSURE OF INVENTION

It is an object of the present invention to provide a process to efficiently laminate a transparent photocatalyst-supporting film at high speed by heating and a photocatalyst-supporting film of which photocatalytic activity is not inferiorly influenced by heat-laminating process of the photocatalyst-supporting film, which enables to carry on a photocatalyst onto surface of a film which is suitable to give lamination thereon at high speed with good production efficiency.

Namely, the present invention is related to a metallic plate and a resin structure obtainable by laminating a photocatalyst-supporting film composed of a polymer resin film, whereto a photocatalyst layer is carried on via an adhesive layer, by heating and pressing onto the surface of the metal plate and the resin structure and having photocatalytic activity capable of decomposing triolein at a rate of 5 μg/cm²/day or more by irradiating ultraviolet rays in UV-A range at a strength of 3 mW/cm² under condition at atmospheric temperature of 25° C. and a relative humidity of 70%.

The present invention is also related to a metallic plate and a resin structure laminated with the said photocatalyst-supporting film, characterized in that said polymer resin film is one obtained by laminating at least two types of resin films, that the polymer resin is one selected from a group consisting of polycarbonate resins, copolymerization resins of at least two types of polymethylmethacrylate resins and/or polyacrylate resins, poly(vinyl chloride) resins and cellophane resins, that the thickness of the polymer resin film is in a range of from 5 to 200 μm, that the adhesive layer is formed by coating a coating solution containing a silane coupler as a hardening agent, that the coating solution for an adhesive layer is prepared by adding a silane coupler in an amount of 0.1-5% by weight based on the weight of the coating solution as a hardening agent into a coating solution containing a denaturated silicon resin in an amount of 2-20% by weight based on the weight of the later coating solution, and the denaturated silicon resin contains either 10-50% by weight of polysiloxane or 5-30% by weight of colloidal silica, that the coating solution for an adhesive layer is prepared by adding a silane coupler in an amount of 1-5% by weight based on the weight of the coating solution as a hardening agent into a coating solution which contains either of monoalkyltrimethoxysilane or its decomposed-product, polysiloxane, in an amount of 1-10% by weight and silica sol in an amount of 0.1-5% by weight based on the later coating solution, that the thickness of the adhesive layer is in a range of from 0.5 to 5 μm, that the photocatalyst-supporting layer contains a metal oxide sol in an amount of 1-10% by weight as a solid component and titanium dioxide sol in an amount of 1-10% by weight as a solid component, that the photocatalyst-supporting layer contains silica sol in an amount of 1-10% by weight, either of monoalkyltrimethoxysilane or its hydrolyzed product in an amount of 1-10% by weight and titanium dioxide sol in an amount of 1-10% by weight, that the thickness of the photocatalyst-supporting layer is in a range of from 0.1 to 5 μm, that the metallic plate is one selected from a group consisting of an iron plate, a stainless steel plate, an aluminium plate and an aluminium alloy plate, that the metallic plate is any of a resin-coated metallic plate, a coated metallic plate and an enameled metallic plate, which are coated either in a single layer or in multiple layers with one or more than two resins selected from a group consisting of poly(vinyl chloride) resins, polyethyleneterephthalate resins and polymethylmethacrylate resins, that the shape of the metallic plate is sheet-like, tubular or corrugated, that the resin structure is one selected from a group consisting of poly(vinyl chloride) resins, polyethyleneterephthalate resins, polymethylmethacrylate resins, polycarbonate resins, polyethylene resins, polypropylene resins, anti-shock denaturated polystyrene resins and a copolymer of acryl-butadiene-stylene, and that the shape of the resin substrate is plate-like, sheet-like, woven fabric-like, nonwoven fabric-like, resin-containing reinforced fabric-like or tubular.

Further, the present invention is related to a process for preparing a metallic plate and a resin structure laminated with a photocatalyst-supporting film characterized in that the process is constituted of the first process to coat and then to dry a coating solution for an adhesive layer added with a silane coupler as a hardening agent onto a polymer resin film, the second process to coat and then to dry a coating solution for a photocatalyst layer onto the adhesive layer to prepare the photocatalyst-supporting film which carries a photocatalyst layer onto the polymer resin film via the adhesive layer and the third process to laminate the photocatalyst-supporting film onto the surface of the metallic plate or the resin structure by applying heating and pressing process.

Again, the present invention is related to reflection plates for lighting fixtures, outdoor signboards, home-use electric appliances, guardrails and road signs which are using the metallic plate laminated with the photocatalyst-supporting film described above at least as a part, and outdoor signboards, telephone boxes, clothes for tents for outdoor use, washstands, modular bathes, systematic kitchens, water tanks for ornamental fishes, plastic cases, wall papers, food trays and films for packaging which are using the resin structure laminated with the photocatalyst-supporting film at least as a part of them.

Furthermore, the present invention is related to a coating solution for adhering a photocatalyst to be used for preparing a photocatalyst-supporting polymer film which carries a photocatalyst on a polymer resin film via an adhesive layer characterized in that the coating solution is prepared by adding a silane coupler in an amount of 0.1-5% by weight based on the weight of the coating solution as a hardening agent into either a coating solution for an adhesive layer which contains at a concentration of 2-20% by weight either a silicon denaturated resin containing 10-50% by weight of polysiloxane or a silicon denaturated resin containing 5-30% by weight of colloidal silica, or a coating solution for an adhesive layer containing monoalkyltrimethoxysilane or the hydrolyzed product, polysiloxane, in an amount of 0.5-5% by weight based on the weight of the coating solution.

Now, the present invention is further described in detail.

The metallic plate and the resin structure laminated with a photocatalyst-supporting film is prepared firstly by coating a coating solution for an adhesive layer containing a silane coupler as a hardening agent onto a film, for example a polymer resin film, then drying the coating solution, and subsequently coating a coating solution for a photocatalyst layer, then drying the coating solution for a photocatalyst layer to prepare a photocatalyst layer on the polymer resin film via an adhesive layer, and then laminating by heating and pressing the photocatalyst-supporting film onto the surface of the metallic plate or the resin structure. The cross section illustration for the inventive metallic plate and the resin structure laminated with the photocatalyst-supporting film is shown in the Figure.

For examples of the material used for the polymer resin film specified in the present invention, polycarbonate resins, copolymer resins made of at least two polymethylmethacrylate resins and/or polyacrylate resins, nylon resins, polyamide resins, polyimide resins, polyacrylonitrile resins, polyurethane resins, poly(vinyl chloride) resins, cellophane resins, polyvinylalcohol resins, vinyl acetate-ethylene copolymer resins and ethylene-vinyl alcohol copolymer resins are given. However, it is preferable to use such materials that have both tensile strength and elastic modulus enough to resist to a given tension caused by a film-forming apparatus in order to avoid causing spreads and wrinkles of the film at coating the solution and forming the photocatalyst layer and the adhesive layer and to obtain a homogeneous and uniform photocatalyst-supporting film.

Among the resins as exemplified above, it is particularly preferable to use a film composed of any of polycarbonate resins, copolymers resins made of at least two polymethylmethacrylate resins and/or polyacrylate resins, poly(vinyl chloride) resins and cellophane resins, and the photocatalyst-supporting film using any of these resins has excellent properties in all of photocatalytic activity, durability, film-forming performance, laminating performance, lower cost, etc. Further, the use of a film prepared by laminating two or more of these films described above can greatly improve important properties for a photocatalyst-supporting film, particularly weather-resistance, heat-resistance, moisture permeability, etc. Therefore, it is possible to design and change the property of the photocatalyst-supporting films depending upon the condition where the film is to be used, which is more advantageous for industrial scale production thereof.

The thickness of the polymer resin film to be used in the present invention is preferably in a range of from 5 to 200 μm, and the formation of both adhesive layer and photocatalyst layer becomes difficult when the thickness is less than 5 µm, whereas the laminating work becomes difficult and requires higher cost when the thickness is more than 200 µm.

The photocatalyst-supporting polymer resin film of the present invention to be used for the lamination onto a metallic plate and a resin structure has a structure wherein an adhesive layer is provided in between the photocatalyst layer and the film, as shown in the Figure. The adhesive layer is prepared by coating and then drying a coating solution for an adhesive layer onto the film, which has a role to firmly adhere a photocatalyst layer onto the film and prevents the deterioration of the activity of the photocatalyst caused by a plasticizer component spreading from the film or the polymer resin laminated with the film and degradation of the film due to photocatalytic effect, and the adhesive layer itself has a characteristic being resistant to the photocatalytic effect.

For the coating solution for an adhesive layer, the one which contains a silane coupler as a hardening agent is preferably used. Incorporation of the silane coupler into the coating solution for an adhesive layer enables to accelerate the hardening of the adhesive layer to form a film, which allows to wind the film without causing sticking of the adhesive layer to the reverse side of the film, thereby enabling the formation of the film at high speed. Further, The incorporation of the silane coupler can prevent the deterioration of photocatalytic activity of the photocatalyst-supporting film laminated onto the surface of a metallic plate by means of heating and pressing and allows to maintain the photocatalytic activity owned by the photocatalyst-supporting film before subjecting it to laminating process.

For an example of the coating solution for an adhesive layer, the one prepared by adding a silane coupler as a hardening agent in an amount of 0.1-5% by weight based on the weight of the coating solution containing at a concentration of 2-20% by weight either a silicon denatured resin containing 10-50% by weight of polysiloxane or a silicon denatured resin containing 5-30% by weight of colloidal silica, into the coating solution is given.

In case of using a silicon denatured resin, such as acryl-silicon resins and epoxysilicon resins, which contains polysiloxane at a concentration of less than 10% by weight, or a silicon denatured resin which contains colloidal silica at a concentration of less than 5% by weight, for the coating solution for an adhesive layer, adhesivity of the photocatalyst layer at the time of light irradiation gets insufficient, and the adhesive layer decomposes due to photocatalytic effect of outdoor strong ultraviolet rays, whereby easy exfoliation of the adhesive layer is caused. Whereas, in case of using a silicon denatured resin which contains more than 50% by weight of polysiloxane or more than 30% by weight of colloidal silica, adhesion between the adhesive layer and a carrier structure gets insufficient, the adhesive layer gets porous, or adhesion between carrier film and the adhesive layer gets insufficient, thereby causing easy exfoliation of photocatalyst layer from the film.

Further, for an example of the coating solution for an adhesive layer, the one prepared by adding a silane coupler as a hardening agent in an amount of 0.1-5% by weight based on the weight of the coating solution into a mixture of silica sol and either of monoalkyltrimethoxysilane or the hydrolyzed product, polysiloxane. For examples of the monoalkyltrimethoxysilane, monomethyltrimethoxysilane and monoethyltrimethoxysilane are preferably given. For the silica gel, it is preferable to use the one having the finest primary particle size, and it is particularly preferable to use the one having a primary particle size less than 20 nm for obtaining a transparent film. To the coating solution, it is preferable to incorporate 0.1-5% by weight of silica gel and either of monoalkyltrimethoxysilane or its hydrolyzed product, polysiloxane, at a concentration of 1-10% by weight for obtaining better adhesive property and catalytic activity. The rate for the amount of silica gel and either of monoalkyltrimethoxysilane or the hydrogenated product is preferably in a range of from 80/20 to 40/60, and addition of an acid catalyst, such as mineral acid, may be useful to accelerate hardening.

The amount of the silane coupler as a hardening agent to be added is preferably in a range of from 0.1 to 5% by weight based on the weight of the coating solution for an adhesive layer, even though the coating solution is composed of polysiloxane-silicon denaturated resin, colloidal silica-silicon denaturated resin or monoalkyltrimethoxysilane-silica sol. In case that the added-amount of the silane coupler is less than 0.1% by weight, the coated-layer sticks to the reverse side of the film when winding the coated-film following to drying, thereby making subsequent coating of the photocatalyst layer difficult. Whereas, in case that the added-amount of the silane coupler is more than 5% by weight, hardening of the coating solution goes too fast or the coating solution gels during the formation of the film. When the silane coupler in an amount of 0.1-5% by weight based on the weight of the coating solution is applied, photocatalytic activity does not deteriorate, even though the photocatalyst-supporting film is laminated onto the surface of a metallic plate or a resin substrate by means of heating and pressing, and the photocatalytic activity can be maintained to the same level as one given before laminating process.

In the present invention, among coating solutions for an adhesive layer, a coating solution prepared by adding a silane coupler as a hardening agent at a concentration of 0.1-5% by weight based on the coating solution into either a coating solution for an adhesive layer which contains at a concentration of 2-20% by weight a silicon denaturated resin either containing 10-50% by weight of polysiloxane or 5-30% by weight of colloidal silica, or a coating solution for the adhesive layer which contains either monoalkyltrimethoxysilane or the hydrolyzed product, polysiloxane, at a concentration of 1-10% by weight and silica sol at a concentration of 0.1-5% by weight is defined as "a coating agent for photocatalyst-adhering layer". The coating agent for photocatalyst-adhering layer is used for preparing the photocatalyst-supporting polymer resin film in which a photocatalyst layer is carried onto a polymer resin film via an adhesive layer, as described above.

For the silane coupler, compounds represented by general formulas, $RSi(X)_3$ and $(R)_2Si(X)_2$, wherein R represents an organic functional group and X represents chlorine or alkoxy, can be used, and wherein R represents methyl, ethyl, vinyl, γ-glycidoxypropyl, γ-methacryloxypropyl, γ-(2-aminoethyl) aminopropyl, γ-chloropropyl, γ-mercaptopropyl, γ-aminopropyl, γ-acryloxypropyl or the like and X represents chlorine and $C_{1-5}$ alkoxy, such as methoxy, ethoxy and β-methoxyethoxy.

Whereas, for a purpose to prevent deterioration of the adhesive layer due to influence of the photocatalytic activity and to improve the durability, a photostabilizing agent and/or an ultraviolet absorbent or the like may be incorporated into the coating solution for an adhesive layer, particularly into the coating agent for photocatalyst-adhering layer. As usable photostabilizing agents, it is preferable to use hindered amine compounds, however, any other photostabilizing agents can be used as well. Whereas, triazole compounds can be used as the ultraviolet absorbent. The amount of the ultraviolet absorbent to be added into the coating solution is in a range of from 0.005% by weight to 10% by weight based on the weight of the coating solution, and more preferably from 0.01% by weight to 5% by weight. The incorporation of a photostabilizing agent and/or a UV absorbent into the coating solution for an adhesive layer, particularly into the coating agent for photocatalyst-adhering layer, enables to improve the weather resistance of a polymer resin film carrying a photocatalyst, which gives an advantage when it is used at outdoor. In addition, addition of a surface active agent in an amount of 0.00001-0.1% by weight into the coating solution for an adhesive layer, particularly into the coating agent for photocatalyst-adhering layer, enables to get excellent metal plates or resin structures laminated with the photocatalyst-supporting film.

For coating an adhesive layer onto a film, a method to coat a coating solution for an adhesive layer, particularly a coating agent for photocatalyst-adhering layer, by means of gravure, microgravure, comma coating, roll coating, reverse roll coating, bar coating, kiss coating and flow coating, then to dry the coating solution can be given.

Appropriate temperature during the drying process can be different depending on a coating method, a solvent used, a type of a resin used for a film and thickness of a film, however, it is preferably at 150° C. or less.

The thickness of the adhesive layer is preferably 0.5 µm or more. When the thickness is less than 0.5 µm, an effect to firmly adhere the photocatalyst layer onto a film gets insufficient and the photocatalyst layer may exfoliate from the film after long time use. Although it is not a substantial problem to make the adhesive layer thick, however, drying during the formation of the adhesive layer gets insufficient, thereby causing the layer irregular and raising the cost for forming the adhesive layer.

The photocatalyst-supporting polymer resin film according to the present invention to be used for lamination onto a metal plate and a resin substrate has a structure that an adhesive layer is provided on a photocatalyst layer, as shown in the Figure. The photocatalyst layer can be formed by coating a coating solution for photocatalyst layer which, for example, contains 1-10% by weight of metal oxide sol as solid component and 1-10% by weight of titanium dioxide sol as solid component and then drying the solution. The metal oxide sol contained in the coating solution for a photocatalyst layer works not only to fix the titanium dioxide sol and firmly adhere it to an adhesive layer but also to enhance photocatalytic activity owing to its absorption property based on the porous structure of the gel obtained by drying the metal oxide sol. Ratio of the metal oxide sol and the titanium dioxide sol in the coating solution for a photocatalyst layer is preferably in a range of from 25/75 to 95/5. Adhesion to the adhesive layer gets insufficient when the ratio of the metal oxide sol is less than 25%, whereas photocatalytic activity gets insufficient when the ratio is more than 95%. Further, when the specific surface area of the gel that is obtained by drying the metal oxide sol is 100 m$^2$/g or more, the adhesivity get more firm as well as improvement in the photocatalytic activity. For an example of the metal in the metal oxide sol, silicon, aluminium, titanium, zirconium, magnesium, niobium, tantalum and tungsten are preferably given, and mixtures of these metal oxide sol and complex oxide sols prepared by coprecipitation method, etc. can be used as well.

When mixing a metal oxide sol with titanium dioxide sol, it is preferable to mix it in sol state or in a state being at before preparing into the sol. As a method to prepare the sol, a method to hydrolyze the metal salt, a method to decompose it under neutral condition, a method to subject it to ion exchange, a method to hydrolyze the metal alkoxide, etc. can be given, however, any methods which allow to obtain the sol wherein titanium dioxide sol is homogeneously distributed can be employed. However, it is more preferable to use a sol which contains less impurities since such impurities in greater amount in the sol may give unfavorable effects on adhesivity of a photocatalyst and its photocatalytic activity. In particular, when organic substance in an amount more than 5% by weight relative to the dry weight of the sol is contained in the sol, photocatalytic activity may be decreased. Particularly, it is more preferable to use zirconium oxide sol or aluminium oxide sol to prepare a photocatalyst layer, since it may facilitate to get through tape exfoliation tests after having either 15 min. resistance test to boiling water or dipping test for 168 hours into 5% sodium carbonate solution.

Whereas, it is particularly preferable to use a coating solution for a photocatalyst layer which is composed of a mixture of silica sol in an amount of 1-10% by weight, either monoalkyltrimethoxysilane or its hydrolyzed-product in an amount of 1-10% by weight and titanium dioxide sol in an amount of 1-10% by weight for coating onto an adhesive layer to obtain a photocatalyst layer. For the monoalkyltrimethoxysilane, it is more preferable to use methyltrimethoxysilane and methyltriethoxysilane. The ratio to mix silica sol with either monoalkyltrimethoxysilane or its hydrolyzed-product, it is preferable to select a rate by weight of from 100/0 to 60/40, whereas as a rate by weight of titanium dioxide sol to a silane compound, it is preferable to use a ratio of from 5/95 to 75/25. In case that the ratio for the silane compound is more than 95, photocatalytic activity may be decreased, while adhesivity to an adhesive layer may be decreased when the ratio is lower than 25.

For the photocatalyst in a photocatalyst layer, $TiO_2$, ZnO, $SrTiO_3$ CdS, GaP, InP, GaAs, $BaTiO_3$. $K_2NbO_3$. $FeO_3$, $Ta_2O_5$, WO3, SnO2, Bi2O3, NiO, Cu2O, SiC, SiO2, MoS2, InPb, RuO2, CeO2, etc. can be given. Further, any photocatalysts as exemplified above whereto a metal, such as Pt, Rh, RuO2, Nb, Cu, Sn and NiO, and their oxide compounds, is incorporated can be also used. The content of a photocatalyst in a photocatalyst layer is preferably lower than 75% by weight in view of adhesivity, though photocatalytic activity increase along with increase of the content. In order to further improve antibacterial and antifungal activities, it is also useful to incorporate a metal or a metallic compound in an amount of 0.05-5% by weight relative to the weight of titanium dioxide photocatalyst in a photocatalyst layer. When the incorporated-amount of such metal compound is less than 0.05% by weight, the improving effect on antibacterial and antifungal activity is poor, while discoloration of a photocatalyst layer may be caused when the incorporated-amount of a metal compound is more than 5% by weight, which may give constrain to use such a photocatalyst layer depending upon the color or design of a resin structure laminated with a film.

For the formation of a photocatalyst layer on an adhesive layer, a suspension wherein a photocatalyst is dispersed in either a metal oxide sol or a metal hydroxide sol can be used according to the coating method as described above in the formation of an adhesive layer. Alternatively, a photocatalyst can be dispersed in a precurser solution of such metal oxide or metal hydroxide, then to prepare sol or gel of such metal oxide or metal hydroxide by subjecting them to hydrolysis or decomposition under neutral condition at coating. When such sol is used, a deflocculant, such as an acid and an alkali, may be added for stablizing the sol suspension. By adding a surface active agent or a silane coupler in an amount of 5% by weight relative to the weight of a photocatalyst into the sol suspension to improve adhesivity and handling efficiency. However, the addition of a silane coupler into a photocatalyst layer cannot prevent decrease in photocatalytic activity at a process to laminate a photocatalyst-carrying film onto the surface of a metallic plate or a resin substrate by heating and pressing and facilitate to maintain the photocatalytic activity owned by a photocatalyst-supporting film before the laminating process. Temperature at forming a photocatalyst layer is preferably 150° C. or lower, though appropriate temperature may differ depending upon coating method, a material used for a film or resin type of an adhesive layer.

The photocatalytic activity increases along with the increase of thickness of a photocatalyst layer, however, in a range more than 5 µm, no more increase of photocatalytic activity is recognized. The photocatalyst layer having thickness less than 5 µm shows high photocatalytic activity, still has light permeability and makes a photocatalyst layer less distinguish, whereas the photocatalyst layer in less than 0.1 µm thick has high light permeability, but it allows ultraviolet rays to be utilized by a photocatalyst passing therethrough, whereby unabling to obtain high photocatalytic activity. High photocatalytic activity can be obtained by making the thickness of a photocatalyst layer to a range of from 0.1 to 5 µm and using a photocatalyst crystals having a particle size of 40 nm or less and either a metal oxide gel or a metal hydroxide gel having a specific surface area of 100 $m^2/g$ or more. In this case, it is also favorable to use such photocatalyst layer in view of picture because it does not defile the appearance of metallic plates, resin-coated metallic plates, coated metallic plates, enameled metallic plates or resin substrate to which a base film is laminated.

For the metal plate to be laminated with a photocatalyst-supporting film by heating and pressing, any kind of metallic plates being typically-used, such as an iron plate, a stainless plate, an alloyed stainless plate, an aluminium plate, an aluminium alloy plate, etc. can be used. For the metallic plate, in addition to simply using a metallic plate as it is, a metallic plate coated in single layer or multiple layers with one or more resins selected from a group consisting of poly(vinyl chloride) resins, polyethyleneterephthalate resins and polymethylmethacrylate resins, a metallic plate coated with paints, an enameled metallic plate, etc. are also preferably used. As to the shape of the metallic plate, any shape which may suit for laminating a photocatalyst-supporting film thereon, such as sheet-like, tubular and corrugated sheet-like, can be selected.

For the resin substrate to be laminated with a photocatalyst-supporting film by heating and pressing according to the present invention, the ones made of a resin selected from a group consisting of poly(vinyl chloride) resins, polyethyleneterephthalate resins, polymethylmethacrylate resins, polycarbonate resins, polyethylene resins, polypropylene resins, denaturated polystyrene resins, shock-resistant polystyrene resins and acryl-butadiene-styrene copolymer resins can be given as examples. As to the shape of the resin substrate, plate-like, sheet-like, fabric-like, unwoven fabric-like, resin-reinforced fabric-like, tubular and the like can be given, and any shape which allows to laminate the photocatalyst-supporting film of the present invention onto them can be applicable.

As a method to laminate the photocatalyst-supporting film onto various types of metallic plates and resin substrates, a method to laminate the film onto a resin structure, such as a metallic plate, a paint-coated metallic plate, a resin-coated metallic plate, an enameled metallic plate, and a resin substrate, such as a resin plate and a paint-coated resin plate, while heating and pressing the film by using a heated roller or the like, a method to laminate a photocatalyst-supporting polymer resin film by heating and pressing, which utilizes heat being applied during manufacturing of resin structures, onto a paint-coated metallic plate, a resin-coated metallic plate, an enameled metallic plate, or a resin substrate, such as a resin plate, a painted resin plate and a resin-coated resin plate, are preferably used because these methods allow industrially efficient manufacturing. For the lamination of the photocatalyst-supporting film by heating and pressing onto a metallic plate or a resin substrate, it is preferable to employ a laminating method by short time heating normally at a temperature of from 60 to 200° C. though it depend on the material of the resin used for the base film, a laminating method by heating and pressing which utilizes heat arising at heating and drying process for coating a resin or paints onto a metallic plate structure, a laminating method by heating and pressing which utilizes heat arising at molding a metallic plate structure, a laminating method to press the film by utilizing heat arising at kneading a base resin to be used for the resin structure, a laminating method by passing through a heated roller or subjecting to hot press and the like can be preferably employed.

Further, in case of a metallic plate of which structure surface is not processed to chemical or coating treatment, it is possible to further improve the film adherence and resistance of the heat-laminated products by using a base structure obtainable by coating and drying a acryl-type, urethane-type or epoxy-type sticker as a primer layer onto the surface of the metal plate to be subjected to heating and pressing. For the heating and pressing of the photocatalyst-supporting film onto the surface of a base structure, a method to pass through a heated roller or to subject to heat-pressing and the like can be employed. In this case, a metallic plate, which can keep its durability and photocatalytic activity even it has been used for a long time, can be obtained by selecting appropriate temperature, pressure and time suitable for the material of a metallic plate or a paint-coated metallic plate, etc. to be used as a structure and the material of the film used for the photocatalyst-supporting film. In the present invention, heating and pressing are employed for the laminating process, which allows to establish firm sticking of the photocatalyst layer to the adhesive layer and to obtain better durability, adherence and anti-exfoliation property than those before subjecting them to heating and pressing process.

In addition, it is further possible to increase the film adherence and durability of laminated-products by subjecting the surface of a resin substrate, whereto heating and pressing process is applied, to corona discharge and ultraviolet radiation and by using a structure on which any of acryl-type, urethane-type and epoxy-type adhesives is coated as a primary layer. Further, it is still feasible to obtain resin structures which has long durability for the use and can keep excellent photocatalytic activity by selecting an appropriate temperature, pressure and time corresponding to the material of a resin substrate, such as a resin plate and a paint-coated resin plate, and the materials used for the photocatalyst-supporting film. Again, according to the present invention, very firm adherence between a photocatalyst layer and an adhesive layer can be gained by applying heating and pressing at lamination process, thereby allowing to provide better durability, adherence and exfoliation resistance to the structure than those properties obtainable from the one before applying heating and pressing process.

The metallic plate and the resin structure laminated by heating and pressing with the photocatalyst-supporting film of the present invention are the one which can degrade triolein at a rate of more than 5 µg/$cm^2$/day when irradiating ultraviolet rays in UV-A region (410-315 nm) at a strength of 3 mW/$cm^2$ under an atmospheric temperature of 25° C. and relative humidity of 70%. Some of the metallic plate laminated with the photocatalyst-supporting film of the present invention shows high durability represented by photocatalyst layer adherence point of 6 or higher according to JIS cross-cut adhesion test method K 5400, even after irradiating black light of 3 mW/cm$^2$ as ultraviolet ray strength for 1,000 hours under a temperature of 40° C. and relative humidity of 90%.

The photocatalyst-supporting film of the present invention provided with an adhesive layer and a photocatalyst layer can be produced at high production efficiency as fast as several ten meters per minute, and lamination of this film onto various metallic plates and resin substrates can be accomplished as fast as a rate of several meters per minute if conditions for the process is well optimized. Accordingly, the present invention has big advantage in improvement in production efficiency and quality, such as homogeneity of film thickness, which are facilitated by quite faster formation of a photocatalyst layer comparing to the fastness in the method to coating and drying a photocatalyst layer onto metallic plates and resin substrates according to common dipping method or spraying method. Further, the metallic plates and the resin substrates laminated with the photocatalyst-supporting film of the present invention has quite a wide application range since those structures can be prepared into various shapes by molding metallic plates and resin substrates by press processing following to lamination with the photocatalyst-supporting film and subsequent cutting.

The metallic plates and the resin structures laminated with the photocatalyst-supporting film of the present invention are widely used as materials for general buildings and outdoor constituted bodies. For examples, in case of metallic plates laminated with the photocatalyst-supporting film, constituted structures along roads, such as soundproof boards for motorway, street-side telephone boxes, road signs and guardrails, metallic plates used in bathrooms, toilets, kitchens, cuisines, etc., commodes, modular bathes, system kitchens, toilet bowls, various sinks, etc. can be given. For examples of the resin structure laminated with the photocatalyst-supporting film, constituted structures along roads, such as advertisement towers, soundproof walls along roads, telephone boxes at street and traffic signs, resin structures used in bathrooms, toilets, washrooms and kitchens, and surface material for home-use goods such as commodes, modular bathes, systemized kitchens, toilet bowls, various sinks, etc. can be given.

The metallic plate laminated with the photocatalyst-supporting film of the present invention is advantageously used for parts where deodorant, antifouling, antibacterial and antifungal effects are required, such as outdoor advertisement boards, walls for transportation vehicles like trains and buses, walls of food factories and feeding facilities, frames for home-use electric appliances, such as refrigerators, washing machines, personal computers, radios and TV, various types of illumination reflectors, interior walls for cooling warehouses and freezing warehouses, and the surface of those which products are kept clean for a long time because of the excellent antifouling, oil-decomposing, antibacterial and antifungal effects of the inventive photocatalyst-supporting film.

When the metallic plate laminated with the inventive photocatalyst-supporting film is used for outdoor advertisement boards, traffic signs and guardrails, soot and lampblack contained in exhaust or the like are decomposed by the film, thereby facilitating removal by wind and raining of dust, sand and clay being attached to the surface of the metallic plate thanks to the adhering effect of soot and lampblack, which eventually give antifouling effect to the metallic plate. When stainless steel plate laminated with the photocatalyst-supporting film of the present invention is used for illumination reflectors, interior oil mist and cigarette smoke attached to the reflectors can be decomposed thanks to ultraviolet rays irradiated from a fluorescent lamp to reduce oily smirch on the surface. Further, when the stainless steel plate laminated with the photocatalyst-supporting film of the present invention is used for frames for home-use electric appliances, such as refrigerators, radios and TV, though amount of ultraviolet rays irradiated to interior is small, interior floating oil mist and hand wax components given by finger touch are gradually decomposed by the photocatalyst action, thereby reducing attached hand wax and dark smirch to the surface.

The resin structure laminated with the photocatalyst-supporting film of the present invention can be used for outdoor signboards made of poly(vinyl chloride) marking films, resin-made window frames for transportation vehicles, such as train cars and buses, outdoor tent sheets, sheets for stacks, tents for warehouse-use, sunlight shield for shops, tent roofs for various arcades, tent roofs and side shield for exhibitions and pavilions, roofs and side shields for petrol stations, waterproof sheets, snow fence sheets, air domes, pool covers, etc., and it is also applicable by placing the resin structure onto the surface of a wood piece or mortar to make walls, doors, ceilings, furnishings, etc. in hospitals or eldercare facilities. As described above, the resin structures laminated with the photocatalyst-supporting film of the present invention can be used for many parts where deodorant, antifouling, antibacterial and antifungal effects are required and allow to keep the surface of products with the resin structure clean for a long time owing to its deodorant, antifouling, antibacterial and antifungal activities.

When using the resin structures laminated with the photocatalyst-supporting film of the present invention for outdoor signboards, clothes for outdoor-use tents, telephone box, etc., dust, sand, clay and the like which attached on the surface of those resin structures owing to the adhesive property of soot and oily stains in exhaust gas can be decomposed by photocatalytic activity provided by the photocatalyst-supporting film and can be easily removed by wind, raining, etc., which eventually gives antifouling effect onto those resin structures. When using the resin structure laminated with the photocatalyst-supporting film of the present invention for water tank made of acryl plates, organic substance and bacteria, which are attached to inside surface of the tank owing to the effect of UV light irradiated from a fluorescence lamp, can be decomposed by the photocatalytic activity of the film, thereby providing antifouling effect onto the surface of the tank against such substance. The resin plates laminated with the photocatalyst-supporting film of the present invention can be also suitably used as a metrail for cuisines, toilets, bathrooms, system kitchens, washstands and modular bathes, because the present photocatalyst-supporting film can give antifouling and antibacterial effects by utilizing even relatively-less UV light under these circumstances. When using the polymer resin structures laminated with the photocatalyst-supporting film of the present invention for outer parts of resin bodies of home-use electric appliances, such as refrigerators, washing machines, personal computers, radios and TV, and various plastic cases, such as tableware cases and seasoning cases, oil mist floating in the air and hand fat components attached thereto can be decomposed by the photocatalytic action of the photocatalyst-supporting film even under less UV light existence in a room environment, thereby stains and dark spots attached on the surface of those electric appliances are reduced accordingly.

BRIEF DESCRIPTION OF DRAWINGS

The Figure is a model diagram for a cross section of a metal body and a resin structure laminated with the photocatalyst-supporting film according to the present invention.

BEST MODE FOR CARRYING OUT THE INVENTION

Now, the present invention is definitely explained with referring the examples described below, however, the scope of the present invention should not be limited to the range described in such examples.

(Evaluation on Photocatalytic Activity)

Evaluations on photocatalytic activity as described below were conducted by using samples No. 1 through 20 and samples for reference examples. The results are shown in Table 1.

1) Antifouling Property

A sample being cut to a dimension of 5 cm×5 cm was placed onto a fence facing to a road (traffic frequence: c.a. 500-1,000 tracks per day) along with a blank sample in same size with no photocatalyst. After 3 months, fouling degree on the surface of the test samples and the blank samples were compared by using a spectral colorimeter based on a check sample kept in a dark and cool room.

| Degree of discoloration increase ($\Delta E$) after 3 months | Evaluated rank |
| --- | --- |
| 5 or less | A |
| 5-10 | B |
| 10-20 | C |
| 20 or more | D |

2) Triolein-decomposing Property (Oil-decomposing Activity)

Triolein (Highest reagent grade, Wako Pure Chemical) in an amount of 0.1 mg/cm$^2$ was coated onto a test sample being cut to a dimension of 5 cm×5 cm by using tissue paper (Kimwipe), and the sample was then place in a container maintained at 25° C. and 70% R.H. The sample in the container was then subjected to irradiation with commercially-available 15 W black light fluorescence lamp by adjusting a distance between the light source and the sample surface so as to receive UV light in UV-A region at strength of 3 mW/cm$^2$ at a surface point of the sample. Reducing amount of triolein relative to light irradiation time was measured by using a analytical balance to determined triolein-decomposing activity.

| Remaining rate of Triolein after 5 days (%) | Evaluated rank |
| --- | --- |
| 10% or lower | A (18 μg/cm$^2$/day or more) |
| 50%-10% | B (10-18 μg/cm$^2$/day) |
| 75%-50% | C (5-10 μg/cm$^2$/day) |
| 95%-75% | D (1-5 μg/cm$^2$/day) |
| 95% or more | E (1 μg/cm$^2$/day or less) |

3) Antibacterial Activity

A sample being cut to a dimension of 5 cm×5 cm was disinfected with 80% ethanol and dried at 150° C. Consequently, bacterial solution of *E. coli* in an amount of 0.2 ml, which is cultured and diluted to a concentration of 105 bacteria/ml beforehand, was fed dropwise onto the surface of the sample and placed in an incubator. For this evaluation test, each 4 samples were provided for two different lighting conditions, one case where irradiation of white fluorescence lamps (15 W×2 lamps, distance between a lamp and the sample, 10 cm) was done and the other case where no irradiation of white fluorescence lamp was given. After predetermined intervals, which are 1, 2, 3 and 4 hours later, respectively, the samples were taken out from the incubator, and the bacterial solution on the sample was removed with disinfected gauze dipped in disinfected physiological saline solution, and the gauze was then put into 10 ml disinfected physiological saline solution and thoroughly stirred. Supernatant obtained was then inoculated to agar medium in a petri dish having a diameter of 95 mm, which is disinfected by autoclave beforehand, and was kept for culturing under a temperature of 36° C. for 24 hours for counting colonies of *E. coli*. On the other hand, a sample for counting bacteria for check was prepared according to the same procedures, and supernatant of bacterial solution in disinfected saline solution was inoculated to agar medium in a Petri dish and kept for 24 hours to grow for subsequent counting of *E. coli* colonies. Based on the numbers of *E. coli* colonies obtained, livability of *E. coli* after pre-determined intervals was calculated for each conditions, respectively. Evaluation was carried out base on the livability of *E. coli* at 4 hours after starting irradiation of fluorescence lamp, and the following criterion was applied to evaluate.

| Livability of *E. coli* after 4 hours | Evaluated rank |
| --- | --- |
| 20% or lower | A |
| 20-40% | B |
| 40-60% | C |
| 60-80% | D |
| 80% or more | E |

4) Antifungal Activity

Degree of green mold grown on the surface of the sample for evaluation of antifouling property was compared according to the following criterion with the samples having been kept in a dark and cool room.

| Degree of grown mold on Sample Surface | Evaluated rank |
| --- | --- |
| Almost no growth | A |
| Little growth recognized on a part | B |
| Growth recognized remarkably | C |

5) Adhesive Property

According to cross-cut adhesion test provided in JIS K 5400, adhesivity of the samples were evaluated. Distance of each cut was set to 2 mm and number of squares was set to 25. Evaluation was accorded to the criterion described in JIS K 5400.

6) Evaluation of Durability

The photocatalyst-supporting samples were allowed to irradiation of black light at ultraviolet ray intensity of 3 mW/cm$^2$ for 1,000 hours in a container maintained at 40° C. and 90% R.H., then the samples were subjected to cross-cut adhesivity test provided in JIS K 5400 to evaluate their durability. Evaluation was accorded to the criterion described in JIS K 5400.

EXAMPLE 1

Preparation of Photocatalyst-supporting Film

A coating solution for an adhesive layer and a coating solution for a photocatalyst layer were coated onto an acryl resin film (Mitsubishi Rayon Co., Ltd., Acryprene HBS-006) having a thickness of 50 μm by using microgravure printer (Yasui Seiki Co., Ltd.). To ethanol-ethyl acetate solution (5/50 ratio by weight) which contains an acrylsilicon resin contains 3 mol % silicon in an amount of 8% by weight as solid component, 20% ethanol solution of methylsilicate MS 51 (Colcoat Co., Ltd.) as polysiloxane in an amount of 35% by weight as solid component relative to the weight of said arylsilicon resin and γ-glycidoxypropylmethoxysilane in an amount of 1% by weight were added to prepare a coating solution for an adhesive layer. An adhesive layer was formed at a speed of 20 m/min. and at 60° C., and then cooled under a room temperature. In the presence of a surface active agent, an equivalent of a solution prepared by dispersing acidic silica sulfate sol so as to contain silica oxide at a concentration of 10% by weight into water-ethanol solution (50/50 ratio by weight) was added to a solution wherein acetic titanium sulfate is dispersed so as to contain titanium dioxide at a concentration of 10% by weight into water-ethanol solution (50/50 ratio by weight) to prepare a coating solution for a photocatalyst layer. A photocatalyst layer was formed with this coating solution according to the same procedures as described above for preparing the adhesive layer to obtain a photocatalyst-supporting film (A). According to the same procedures, other photocatalyst-supporting films were prepared by coating an adhesive layer and a photocatalyst layer onto an acryl-type film (Kanegafuchi Kagaku Co., Ltd., Sandulene 008NCT) having a thickness of 50 μm (film B) and hard-type vinyl chloride film having a thickness of 50 μm (film C) under different temperature and drying condition.

EXAMPLE 2

Preparation of an Iron Plate Laminated with a Photocatalyst-supporting Film

The photocatalyst-supporting film (A) obtained in Example 1 was attached onto the surface of an iron plate in 1 mm thick being cut to a dimension of 5 cm×5 cm, whereto an acryl-type adhesive as a primer is coated and dried, and the iron plate was subjected to air evacuation by applying pressure for 10 min. at a degree of 50 kg/cm$^2$ five times at 120° C. The iron plate was further heated and pressed for 2 min. at the same temperature and at a degree of 50 kg/cm$^2$, for 2 min. at 100 kg/cm$^2$, and for 1 min. at 150 kg/cm$^2$, and then cooled down to 50° C. while applying pressure to obtain an iron plate laminated with a photocatalyst-supporting film. (Sample 1)

EXAMPLE 3

Preparation of an Aluminium Plate Laminated with a Photocatalyst-supporting Film The photocatalyst-supporting film (A) obtained in Example 1 was attached onto the surface of an aluminium plate in 1 mm thick being cut to a dimension of 5 cm×5 cm, whereto an acryl-type adhesive as a primer is coated and dried, to obtain an aluminium plate laminated with a photocatalyst-supporting film according to the same laminating procedures as described in Example 2. (Sample 2)

EXAMPLE 4

Preparation of a Stainless Steel Plate Laminated with a Photocatalyst-supporting Film The photocatalyst-supporting film (A) obtained in Example 1 was attached onto the surface of a stainless steel plate (SUS-304) in 1 mm thick being cut to a dimension of 5 cm×5 cm, whereto an acryl-type adhesive as a primer is coated and dried, to obtain a stainless steel plate laminated with a photocatalyst-supporting film according to the same laminating procedures as described in Example 2. (Sample 3)

EXAMPLE 5

Preparation of a Paint-Coated Steel Plate Laminated with a Photocatalyst-supporting Film The photocatalyst-supporting film (B) obtained in Example 1 was laminated onto a heat-coated steel plate with an acryl-type paint having a thickness of 0.3 mm, a width of 60 cm and a length of 1 m by using a heat-pressing type laminating roller under condition of nipping pressure of 5 kg/cm, sheet surface temperature of 150° C. at laminating roller point and sheet feeding speed of 10 m/min. to prepare a coated steel laminated with a photocatalyst-supporting film. This laminated, paint-coated steel plate was cut to a dimension of 5 cm×5 cm to obtain a sample to provide for tests. (Sample 4)

EXAMPLE 6

Preparation of a Paint-Coated Aluminium Plate Laminated with a Photocatalyst-supporting Film The photocatalyst-supporting film (B) obtained in Example 1 was attached to a paint-coated aluminium plate in 1 mm thick and cut to a dimension of 5 cm×5 cm, whereto an acryl-type coating material is heat-coated, and was processed according to the same procedures as described in Example 2 to obtain a paint-coated aluminium plate laminated with a photocatalyst-supporting film. (Sample 5)

EXAMPLE 7

Preparation of a Vinyl Chloride-coated Steel Plate Laminated with a Photocatalyst-supporting Film The photocatalyst-supporting film (C) obtained in Example 1 was attached to a vinyl chloride-coated steel plate in 1 mm thick and cut to a dimension of 5 cm×5 cm, and the attached-steel plate was then subjected to pressing 4-5 times for each 10 seconds at a pressure of 50 kg/cm$^2$ to complete air evacuation. Then, the attached steel plate was subjected to heating and pressing for 30 seconds at the same temperature and pressure of 50 kg/cm$^2$, for 1 min. at 100 kg/cm$^2$ and for 30 seconds at 150 kg/cm$^2$ and then cooled down to below 50° C. while pressing to obtain a vinyl chloride-coated steel plate laminated with a photocatalyst-supporting film. (Sample 6)

EXAMPLE 8

Preparation of a Polyester-coated Steel Plate Laminated with a Photocatalyst-supporting Film The photocatalyst-supporting film (C) obtained in Example 1 was attached to a polyester-coated steel plate in 1 mm thick and cut to a dimension of 5 cm×5 cm according to the same procedures as described in Example 7 to obtain a polyester-coated steel plate laminated with a photocatalyst-supporting film. (Sample 7)

EXAMPLE 9

Preparation of an Iron Plate Laminated with a Copper-added Photocatalyst-supporting Film In the presence of a surface active agent, the equivalent amount of water-ethanol solution composed in 50/50 ratio by weight, whereto acidic silica nitrate sol is dispersed so as to contain silica oxide sol in an amount of 10% by weight, is added to water-ethanol solution composed of 50/50 ratio by weight, whereto acidic titanium nitrate sol is dispersed so as to contain titanium dioxide in an amount of 10% by weight. To the resulting mixture, copper nitrate hydrate was added and dissolved so as to be a concentration of 0.1% by weight based on metal copper relative to titanium dioxide, and a photocatalyst-supporting film coated with an adhesive layer and a photocatalyst layer was prepared by using same film, same materials and same procedures as employed for preparing the fil (A) described in Example 1 except the preparation process of the coating solution for a photocatalyst layer. The photocatalyst-supporting film prepared here above was attached with an iron plate in 1 mm thick and cut to a dimension of 5 cm×5 cm according to the same procedures as described in Example 2 to obtain an iron plate laminated with a copper-added photocatalyst-supporting film. (Sample 8)

EXAMPLE 10

Reflection Plates for Lighting Fixtures

A reflection plate for fluorescence lamp is produced by using a coated steel plate laminated with the photocatalyst-supporting film prepared in Example 5. The reflection plate was then cut into a piece having a dimension of 5 cm×5 cm to prepare a sample for property evaluation. (Sample 9)

EXAMPLE 11

Outdoor Signboards

A outdoor signboard is prepared by using a coated steel plate laminated with the photocatalyst-supporting film prepared in Example 5.

The evaluated rank of the outdoor signboard using the prepared steel plate laminated with the photocatalyst-supporting film for antifouling effect conducted according to a method described later was A. On the other hand, antifouling effect of a steel plate laminated with a film without carrying a photocatalyst was evaluated as D rank.

EXAMPLE 12

Refrigerator

A box to be used for a vegetable container for a refrigerator was prepared by using a iron plate laminated with the photocatalyst-supporting film prepared in Example 9. Three fluorescence lamps for photocatalyst, Ecoclean (FC2BLB/200T12) manufactured by Toshiba Laitec was lighten in the box, and 5 carrot fruits, 2 cabbage rolls, 10 tomato fruits, 10 cucumber fruits, 1 bundle of spinach and 10 green pepper fruits were directly placed in the box, and each placed vegetables in same number were replaced with new ones every 3 days. Another box in same size was prepared by using an iron plate laminated with a film carrying no photocatalyst, and three fluorescence lamps for photocatalyst, Ecoclean (FC2BLB/200T12) manufactured by Toshiba Laitec was lighten in the box, and same variety and number of vegetables were placed in the box. Each f the placed vegetables were replaced with new ones in same number every 3 days. As a result, almost no mold and stain were recognized for the box prepared by using the iron plate laminated with the photocatalyst-supporting film. Contrary, remarkable mold growth and stains were recognized in the box prepared by using an iron plate laminated with a film carrying no photocatalyst.

EXAMPLE 13

Guardrails

A guardrail was prepared by using a coated steel plate laminated with the photocatalyst-supporting film prepared in Example 5 to examine its antifouling property, for which method is described later. Similarly, another guardrail prepared by using a coated steel plate laminated with a film carrying no photocatalyst was prepared to compare its antifouling property. As a result, antifouling property of the guardrail made of the coated steel plate laminated with the photocatalyst-supporting film was evaluated as A, whereas antifouling property of the one made of the coated plate laminated with the film carrying no photocatalyst was evaluated as D.

EXAMPLE 14

Road Signs

A signboard having a similar size as that of a road sign was prepared by using a coated steel plate laminated with the photocatalyst-supporting film prepared in Example 5 to evaluate its antifouling property, for which method is described later. Another road sign having a same size prepared by using a coated steel plate laminated with a film carrying no photocatalyst was prepared to compare its antifouling property. As a result, antifouling property of the road sign prepared by using the coated steel plate laminated with the photocatalyst-supporting film was evaluated as A, whereas antifouling property of the road sign prepared by using the coated steel plate laminated with the film carrying no photocatalyst was evaluated as D.

EXAMPLE 15

Durability Evaluation on a Laminated Steel Plate

The guardrail prepared in Example 13 was installed outdoor for a year, and adhesion property of the guardrail was then checked at ten different places according to the criterion as described later. The adhesion property of the guardrail was evaluated as 8 points at 4 places and 10 points at 6 places.

REFERENCE EXAMPLE 1

Acryl resin film, Acryplane HBS-006, manufactured by Mitsubishi Rayon Co., Ltd. indicated in Example 1 having 50 μm thickness was attached to an iron plated cut to a dimension of 5 cm×5 cm to prepare an iron plate laminated with PET film.

REFERENCE EXAMPLE 2

Acryl resin film, Acryplane HBS-006, manufactured by Mitsubishi Rayon Co., Ltd. indicated in Example 1 having 50 μm thickness was attached to a steel plate coated by means of baking coating with acryl-type coating cut to a dimension of 5 cm×5 cm to prepare a coated steel plate laminated with an acryl film according to the same method and conditions indicated in Example 2.

REFERENCE EXAMPLE 3

Hard vinyl chloride film manufactured by Sumitomo Bakelite Co., Ltd. indicated in Example 1 in 50 μm thick was attached to a steel plated in 1 mm thick coated with vinyl chloride and cut to a dimension of 5 cm×5 cm to prepare a steel plate laminated with vinyl chloride film according to the same method and conditions indicated in Example 5.

REFERENCE EXAMPLE 4

According to Example 48 described in WO 97-134, a coating solution for an adhesive layer was prepared by adding cataroid S1-350 (Shokubai Kasei Co., Ltd.) into aqueous acrylsilicon resin emulsion containing 20% silicon so as to adjust the content of SiO2 in the dried adhesive layer at 10%, thereby adjusting the content of whole dry solid components to 20%. On the other hand, a coating solution for a photocatalyst layer was prepared so as to contain titanium dioxide P-25 for photocatalyst-use (Nihon Aerozil Co., Ltd.) at a content of 30% as solid component, Silica zol cataroid S1-30 (Shokubai Kasei Co., Ltd.) at a content of 20% as solid component, Alumina zol-200 (Nissan Chemical Industries Co., Ltd.) at a content of 10% as dry solid component, acrylsilicon resin emulsion containing 20% by weight silicon at a content of 35% as nonvolatile residue and tri(β-methoxyethoxy)vinyl-silane (Nihon Uniker Co., Ltd.) as a coupler at a content of 5% as nonvolatile component and so as to make the content of whole dry residue at 10%. Though application of coating was carried out by using these coating solutions onto acryl film in 50 μm thick, Acryplane HBS-006, manufactured by Mitsubishi Rayon by using microgravure printer (Yasui Seiki Co., Ltd.), film coating was not successful due to insufficient drying and hardening of the adhesive layer. Alternatively, such coating was tried by using the same coating solutions for an adhesive layer and a photocatalyst layer onto the acryl film (Mitsubishi Rayon Co., Ltd.) indicated above by using a desk bar coater, and the coated film was then dried at 80° C., however, 1 hour time was required to dry the coated film. The acryl film carrying a photocatalyst was attached to the surface of polyester resin-coated steel plate cut to a dimension of 5 cm×5 cm and subjected to heat lamination process according to the same method and conditions indicated in Example 2. Antifouling, oil-decomposing, antibacterial, and antifungal property, adhesivity, and durability of the polyester resin-coated steel plate heat-laminated with the photocatalyst-supporting film were shown in Table 1, which demonstrates its inferiority in oil-decomposing property, durability, etc. As explained above, application of the photocatalyst-supporting film prepared by using a coating solution for an adhesive layer containing no silane coupler therein was found to be inadequate.

EXAMPLE 16

Polycarbonate Resin Laminated with Photocatalyst-supporting Film

A polycarbonate plate laminated with a photocatalyst-supporting film was prepared. The photocatalyst-supporting film (A) obtained in Example 1 was subjected 5 times to air evacuation for each 10 minutes under a room temperature and at a pressure of 50 kg/cm$^2$. Then, the film was heated and pressed in series, for 2 min. at 120° C. and pressure of 50 kg/cm$^2$, for 2 min. at 120° C. and pressure of 100 kg/cm$^2$, and for 1 min. at 120° C. and pressure of 150 kg/cm$^2$. Then, the film was cooled down to a temperature lower than 50° C. while maintaining pressure and was attached to a piece of polycarbonate resin plate in 3 mm thick being cut to a dimension of 10 cm×10 cm, Polycace EC 100 (Tsutsunaka Plastic Co., Ltd.) to obtain a polycarbonate plate laminated with a photocatalyst-supporting film. The sample obtained has excellent transparent property, which is expressed as 0.7% in Heiz ratio and 90.2% in whole rays transmissivity. (Sample 10)

EXAMPLE 17

Vinyl Chloride Resin Laminated with Photocatalyst-supporting Film

The photocatalyst-supporting film (C) obtained in Example 1 was attached to hard poly(vinyl chloride) resin plate (Sekisui Chemical Co., Ltd.) in 3 mm thick being cut to a dimension of 10 cm×10 cm according to the same process indicated in Example 2 to prepare a hard vinyl chloride resin plate laminated with the photocatalyst-supporting film. (Sample 11)

EXAMPLE 18

Acryl Resin Laminated with Photocatalyst-supporting Film

The photocatalyst-supporting film (A) obtained in Example 1 was attached to an acryl plate, Delaglass A No. 999 (Asahi Chemical Co., Ltd.), in 3 mm thick being cut to a dimension of 10 cm×10 cm by using the same apparatus indicated in Example 2, and the attached acryl plate Delaglass A was then pressed under heating for 10 min. at 140° C. and under pressure of 160 kg/cm$^2$ by using a heat-pressing apparatus to prepare an acryl resin plate laminated with the photocatalyst-supporting film. (Sample 12)

EXAMPLE 19

ABS Resin Laminated with Photocatalyst-supporting Film

The reverse side of the photocatalyst-supporting film (B) obtained in Example 1 was attached to an ABS resin plate (Cycolac EX215, Ube Cycon Co., Ltd.) in 3 mm thick being cut to a dimension of 10 cm×10 cm. The attached ABS resin plate was then pressed under heating for 10 min. at 120° C. and under pressure of 160 kg/cm² by using a heat-pressing apparatus to prepare an ABS resin plate laminated with the photocatalyst-supporting film. (Sample 13)

EXAMPLE 20

HIPS Resin Laminated with Photocatalyst-supporting Film

The reverse side of the photocatalyst-supporting film (B) obtained in Example 1 was attached to a HIPS resin plate (Idemitsu Styrol HT-54, Idemitsu Petrochemical Co., Ltd.) in 3 mm thick being cut to a dimension of 10 cm×10 cm. The attached HIPS resin plate was then pressed under heating for 10 min. at 100° C. and under pressure of 160 kg/cm² by using a heat-pressing apparatus to prepare a HIPS resin plate laminated with the photocatalyst-supporting film. (Sample 14)

EXAMPLE 21

Vinyl Chloride Resin Laminated with Copper-added Photocatalyst-supporting Film

According to the same procedure and apparatus described in Example 1 except using a coating solution for a photocatalyst layer wherein 0.01% by weight of copper sulfate hydrate relative to the weight of titanium dioxide is added and dissolved, a photocatalyst-supporting film in 50 μm thick using an acryl-type film (Acryprene HBS-006, Mitsubishi Rayon Co., Ltd.) as a base film was prepared. The photocatalyst-supporting acryl resin film obtained was then attached to a transparent hard poly(vinyl chloride) resin plate (Sekisui Chemical Co., Ltd.) in 3 mm thick being cut to a dimension of 10 cm×10 cm to prepare a hard vinyl chloride resin plate laminated with copper-added photocatalyst-supporting film. (Sample 15)

EXAMPLE 22

Washstand Manufactured by Using ABS Resin Plates Laminated with Photocatalyst-supporting Film Using the photocatalyst-supporting film and ABS resin used in Example 19, an ABS resin plate was laminated with the photocatalyst-supporting film under conditions of nib pressure of 3 kg/cm, sheet surface temperature at a laminating roller point of 130° C. and sheet feeding speed of 10 m/min. by using a heated laminating roller to prepare double doors beneath a washstand. For evaluation on the property, the laminated plate was then cut to a dimension of 5 cm×5 cm to provide the sample for tests. (Sample 16)

EXAMPLE 23

Outdoor Signboards Using an Acryl Plate Laminated with Photocatalyst-supporting Film To an acryl resin plate, was attached a colored marking film for outdoor signboards use made of vinyl chloride, manufactured by Sumitomo 3M Co., Ltd., which is cut out in a letter form. Then, the photocatalyst-supporting film (C) obtained in Example 1 was laminated onto the acryl resin board according to the same procedure in Example 8 under conditions of nib pressure of 3 kg/cm, sheet surface temperature at a laminating roller point of 120° C. and sheet feeding speed of 10 m/min. to prepare an outdoor-use acryl resin signboard laminated with the photocatalyst-supporting film. For evaluation on the property, a piece of the laminated acrylic resin plate was cut to a dimension of 5 cm×5 cm to provide the sample. (Sample 17)

EXAMPLE 24

Modular Bath Made of Polyester Plates being Laminated with a Photocatalyst-supporting Film Using a polyester resin plate and the photocatalyst-supporting film (C) prepared in Example 1, an polyester resin plate for modular bath use laminated with the photocatalyst-supporting film was prepared according to the same procedure in Example 8 under conditions of nib pressure of 3 kg/cm, sheet surface temperature at a laminating roller point of 120° C. and sheet feeding speed of 10 m/min. For evaluation on the property, the laminated polyester resin plate was then cut to a dimension of 5 cm×5 cm to provide the sample for tests. (Sample 18)

EXAMPLE 25

A Water Tank Made of Acryl Plates being Laminated with a Photocatalyst-supporting Film Using an acryl resin plate and the photocatalyst-supporting film (C) prepared in Example 1, an acryl resin plate laminated with the photocatalyst-supporting film was prepared by using a laminating roller under conditions of nib pressure of 3 kg/cm, sheet surface temperature at a laminating roller point of 120° C. and sheet feeding speed of 10 m/min. Then, a water tank was produced by using the acryl resin plates laminated with a photocatalyst-supporting film. For evaluation on the property, a piece of the laminated acryl resin plate cut to a dimension of 5 cm×5 cm was to provide as a sample for tests. (Sample 19)

EXAMPLE 26

A Closet Door for Systematic Kitchen Use Made of HIPS Boards Being Laminated with a Photocatalyst-supporting Film Using a HIPS resin board and the photocatalyst-supporting film (C) prepared in Example 1, a HIPS resin board laminated with the photocatalyst-supporting film was prepared by using a laminating roller under conditions of nib pressure of 3 kg/cm, sheet surface temperature at a laminating roller point of 120° C. and sheet feeding speed of 10 m/min. Then, a closet door for systematic kitchen use was produced by using the HIPS resin board being laminated with a photocatalyst-supporting film. A piece of the laminated HIPS resin board cut to a dimension of 30 cm×30 cm was attached onto an existing closet door of systematic kitchen furniture. After 6 months, antifouling degree on the part where HIPS resin board laminated with a photocatalyst-supporting film was attached was evaluated by using a photometric color difference detector. The difference (ΔE) in the photometric color at the part where the laminated HIPS resin board was attached was found to be 4.5, whereas ΔE at a part of wall paper without photocatalyst lamination was found to be 16.5, where further staining is progressing.

EXAMPLE 27

Wall Papers Made of Vinyl Chloride Sheets being Laminated with a Photocatalyst-supporting Film Using a vinyl chloride sheet added with a foaming agent for wall paper use and the photocatalyst-supporting film (C) prepared in Example 1, a foaming vinyl chloride wall paper laminated with the photocatalyst-supporting film was prepared by using a heat laminating apparatus equipped with an embossing roller under conditions of nib pressure of 3 kg/cm, sheet surface temperature at an embossing roller point of 140° C. and sheet feeding speed of 10 m/min. A piece of the laminated wall paper cut to a dimension of 1 cm×1 cm was attached onto a wall in a room. After 6 months, antifouling degree on the part where the wall paper laminated with the photocatalyst-supporting film was attached was evaluated by using a photometric color difference detector. The difference (ΔE) in the photometric color at the part where the laminated wall paper was attached was found to be 6.5, whereas ΔE at a part of wall where a wall paper without photocatalyst lamination was found to be 26.5, where further staining has been progressed.

EXAMPLE 28

Trays for Food Use Laminated with Photocatalyst-supporting Film

A polypropylene sheet laminated with a photocatalyst-supporting film was prepared by coating an urethane-type adhesive onto a surface of a polypropylene sheet in 0.5 mm thick whereto corona discharging was applied and subsequently laminating the photocatalyst-supporting film (A) prepared in Example 1 by using a heat laminating roller under conditions of nib pressure of 3 kg/cm, sheet surface temperature at the laminating roller point of 140° C. and sheet feeding speed of 10 m/min. The laminated sheet was then pressed under heating to prepare a tray for food use. Beef meat in an amount of 200 g was put in the tray (length 25 cm×width 10 cm×depth 3 cm), and the tray was covered with polyethylene film and placed in an incubator wherein lighting with 4×10 W fluorescent lamps at a distance of 15 cm is applied. The tray was then kept therein together with a tray made of polypropylene without photocatalyst film lamination containing beef meat. Beef meat contained in the tray made of polypropylene without photocatalyst film lamination was discolored after 4 hours and caused some decay smell, whereas beef meat contained in the polypropylene tray laminated with a photocatalyst-supporting film caused almost no decay smell and very low discoloring.

EXAMPLE 29

Packaging Films Laminated with Photocatalyst-supporting Film

A polyethylene sheet laminated with a photocatalyst-supporting film was prepared by coating an acryl-type adhesive onto a surface of a polyethylene sheet whereto corona discharging is applied and by subsequently laminating the photocatalyst-supporting film (A) prepared in Example 1 by using a heat laminating roller as described in Example 14 under conditions of nib pressure of 3 kg/cm, sheet surface temperature at the laminating roller point of 130° C. and sheet feeding speed of 10 m/min. A bundle of spinach was rapped with the laminated polyethylene sheet and was compared with another bundle of spinach rapped with polyethylene film with no photocatalyst-carrying film lamination under lighting using three 15 W fluorescent lamps. After 4 hours checking, spinach in the tray made of polyethylene with photocatalyst-supporting film lamination showed almost no discoloring, whereas spinach in tray made of polyethylene with no photocatalyst lamination caused discoloring to dark green and was withered. It seems that ethylene gas discharged from spinach was decomposed to cause such discoloration.

REFERENCE EXAMPLE 5

An acryl-type film, Acryprene HBS-006 manufactured by Mitsubishi Rayon Co., Ltd., in 50 μm thick was attached to a piece of polycarbonate resin plate, Polyca Ace ECK 100 manufactured by Tsutsunaka Plastic Co., Ltd., in 3 mm thick being cut to a dimension of 5 cm×5 cm according to the same procedure described in Example 16 to prepare a polycarbonate plate laminated with an acryl resin film.

REFERENCE EXAMPLE 6

An acryl-type film, Sundurene 008NCP manufactured by Kanegafuchi Chemical Co., Ltd., in 50 μm thick was attached to a piece of Delaglass A No. 999 manufactured by Asahi Chemicals Co., Ltd., in 3 mm thick being cut to a dimension of 5 cm×5 cm and pressed by using a heat pressing apparatus according to the same procedure described in Example 18 to prepare an acryl resin plate laminated with an acryl resin film.

REFERENCE EXAMPLE 7

A hard vinyl chloride film manufactured by Sumitomo Bakelite Co., Ltd., in 50 μm thick was attached to a piece of transparent hard poly(vinyl chloride) resin plate manufactured by Sekisui Chemical Co., Ltd., in 3 mm thick being cut to a dimension of 5 cm×5 cm according to the same procedure described in Example 17 to prepare a hard poly(vinyl chloride) plate laminated with vinyl chloride film.

REFERENCE EXAMPLE 8

A photocatalyst-supporting acryl resin film was prepared by coating a coating solution for an adhesive layer and a coating solution for a photocatalyst layer prepared according to the procedure described in Reference Example 4 onto an acryl-type film manufactured by Mitsubishi Rayon Co., Ltd. described above by using a desk-type bar coater. The obtained photocatalyst-supporting acryl resin film was then attached to a polycarbonate resin plate, Polyca Ace EC100 manufactured by Tsutsunaka Plastic Co., Ltd., in 3 mm thick being cut to a dimension of 10 cm×10 cm according to the same procedure described in Example 14 to prepare heat-laminated polycarbonate resin plate. The antifouling, oil-decomposing, antibacterial, and antifungal properties, adhesivity and durability of the heat-laminated polycarbonate resin plate were shown in Table 1. As can be seen in the table, the photocatalytic activity and durability of the sample were low. It is demonstrated that coating of the photocatalyst-supporting film prepared with a coating solution for an adhesive layer containing no silane coupler therein onto a transparent polycarbonate resin plate is not effective.

TABLE 1

| Sample No. | Antifouling Effect | Oil-decomposing Activity | Antibacterial Activity | Antifungal Activity | Adhesivity | Durability |
|---|---|---|---|---|---|---|
| Sample 1 | B | A | B | B | 10 | 10 |
| Sample 2 | B | A | B | B | 10 | 10 |
| Sample 3 | B | A | B | B | 10 | 10 |
| Sample 4 | B | B | B | B | 10 | 10 |
| Sample 5 | B | B | B | B | 10 | 10 |
| Sample 6 | B | C | B | B | 10 | 10 |
| Sample 7 | B | C | B | B | 10 | 10 |
| Sample 8 | B | A | A | A | 10 | 10 |
| Sample 9 | B | B | B | B | 10 | 10 |
| Sample 10 | B | B | B | B | 10 | 10 |
| Sample 11 | B | C | B | B | 10 | 10 |
| Sample 12 | B | B | B | B | 10 | 10 |
| Sample 13 | B | B | B | B | 10 | 10 |
| Sample 14 | B | B | B | B | 10 | 10 |
| Sample 15 | B | B | A | A | 10 | 10 |
| Sample 16 | B | B | B | B | 10 | 10 |
| Sample 17 | B | C | B | B | 10 | 10 |
| Sample 18 | B | C | B | B | 10 | 10 |
| Sample 19 | B | B | B | B | 10 | 10 |
| Ref. Exam. 1 | D | E | E | C | — | — |
| Ref. Exam. 2 | D | E | E | C | — | — |
| Ref. Exam. 3 | D | E | E | C | — | — |
| Ref. Exam. 4 | D | D | C | C | 10 | 6 |
| Ref. Exam. 5 | D | E | E | C | — | — |
| Ref. Exam. 6 | D | E | E | C | — | — |
| Ref. Exam. 7 | D | E | E | C | — | — |
| Ref. Exam. 8 | D | D | C | C | 10 | 6 |

INDUSTRIAL USE

The metallic plates and resin structures laminated with a photocatalyst-supporting film according to the present invention are useful as materials for exterior construction materials, interior building materials, structures along roads, outdoor signboards, outdoor signs, home-use electric appliances, various lighting equipments, and goods and installations used in cuisine, kitchens, toilets, and bathroom, etc., which require higher photocatalytic activity, excellent durability, and antifouling, antibacterial and antifungal properties, and are advantageous in view of cost-performance comparison. The photocatalyst-supporting film of the present invention provided with an adhesive layer and a photocatalyst layer has no problem such as blocking, when coating the costing solution for an adhesive layer, particularly a coating agent for photocatalyst-adhering layer, onto a polymer resin film, which allows high productivity and fast film formation at a speed more than several tens meters per minute. Additionally, at laminating process of the photocatalyst-supporting film onto various metallic plates and resin structures, it is possible to facilitate faster film formation at a speed of more than several tens meters per minute by optimizing the conditions during the process since no deterioration of photocatalytic activity may be caused during such laminating process.

What is claimed is:

1. A coating agent for adhering a photocatalyst for preparing a photocatalyst layer onto a polymer resin film via an adhesive layer characterized in that the coating agent is prepared by adding a silane coupler in an amount of 0.1-5% by weight relative to the weight of a coating solution for the adhesive layer as a hardening agent into the coating solution for an adhesive layer containing 2-20% by weight of silicon denaturated resin, which contains either polysiloxane in an amount of 10-50% by weight or colloidal silica in an amount of 5-30% by weight.

2. A coating agent for adhering a photocatalyst for preparing a photocatalyst layer onto a polymer resin film via an adhesive layer characterized in that the coating agent is prepared by adding a silane coupler in an amount of 0.1-5% by weight relative to the weight of a coating solution for an adhesive layer as a hardener into the coating solution for an adhesive layer containing either monoalkyltrimethoxysilane or its hydrolyzed product, polysiloxane, in an amount of 1-10% by weight and silica sol in an amount of 0.1-5%.

* * * * *